United States Patent [19]

Cavalla et al.

[11] 3,910,931
[45] Oct. 7, 1975

[54] 1-(NAPHTHYLALKYL- OR INDENYLALKYL)-PIPERIDINES

[75] Inventors: John Frederick Cavalla, Isleworth; John Leheup Archibald, Windsor, both of England

[73] Assignee: John Wyeth & Brother Limited, Maidenhead, England

[22] Filed: Nov. 15, 1974

[21] Appl. No.: 524,162

Related U.S. Application Data

[63] Continuation-in-part of Ser. No. 323,684, Jan. 15, 1973, abandoned, which is a continuation-in-part of Ser. No. 175,345, Aug. 26, 1971, abandoned.

[52] U.S. Cl. . 260/293.62; 260/293.65; 260/293.77; 260/293.87; 260/295 F; 260/295 Q; 260/295 AM; 260/294.8 C; 260/294.8 F; 260/295 R; 260/348 R; 260/592; 260/607 A; 260/612 D; 260/618 F; 260/651 R; 260/699 R; 424/267
[51] Int. Cl.² .................................... C07D 211/58
[58] Field of Search .............................. 260/293.62

[56] References Cited
OTHER PUBLICATIONS
Chemical Abstracts 72:132,355r (1970) Casadio et al.
Chemical Abstracts 77:34,355z (1972) Archibald et al.
Chemical Abstracts 79:136,989t (1973) Archibald.

Primary Examiner—Sherman D. Winters

[57] ABSTRACT

A group of heterocyclic compounds useful in the treatment of disorders and diseases of the cardiovascular system and/or in the treatment of superficial deep allergic phenomena is described. These are piperidine compounds linked by naphthyl, 1,2,3,4-tetrahydronaphthyl or idenyl radicals through the intermediary of a group selected from a lower-alkylene radical, a mono- -keto lower-alkylene radical or a hydroxy-lower-alkylene radical, or a bivalent radical of the formula

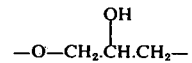

or —O(lower-alkylene)—. The ring is further substituted by an amino or acylamino residue.

12 Claims, No Drawings

1-(NAPHTHYLALKYL- OR INDENYLALKYL)-PIPERIDINES

This invention relates to novel naphthyl and indenyl derivatives of heterocyclic compounds and is a continuation-in-part of U.S. Ser. No. 323,684 filed Jan. 15, 1973, now abandoned, which is a continuation-in-part of U.S. Pat. application Ser. No. 175,345 filed Aug. 26, 1971, entitled "Pharmaceutical Compositions" and now abandoned.

The invention provides a heterocyclic compound of the general formula:

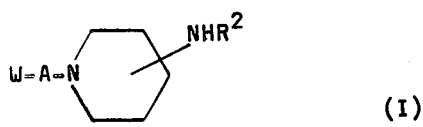

(I)

wherein W represents a carbocylic aryl radical selected from naphthyl, 1,2,3,4-tetrahydronaphthyl and indenyl radicals, A represents a lower alkylene radical, a mono-keto lower alkylene radical, a hydroxy-lower-alkylene radical or a bivalent radical of the formula $-O-CH_2CH(OH)CH_2-$ or $-O-$(lower alkylene)$-$, $R^2$ represents hydrogen or the group $-COR$, where R represents a phenyl radical or a cyclohexyl radical, the term "lower" means that the radical contains from 1 to 6 carbon atoms, and the pharmaceutically acceptable acid addition salts thereof.

It is to be understood that the term "alkylene" used herein includes both straight and branched chain radicals, the term "lower" means the radical concerned contains 1 to 6 carbon atoms, preferably 1 to 4 carbon atoms and by the term "aryl" radical is meant a radical possessing aromatic character.

The compounds of formula (I) and the pharmaceutically acceptable acid addition salts thereof and wherein $R^2$ is COR, exhibit pharmacological activity for example one or more of the following activities: action on the cardiovascular system (such as hypotensive and/or antihypertensive and/or peripheral vasodilation and/or anti-anginal and/or anti-arrhythmic activity), antihistamine activity such as activity against superficial and deep allergic phenomena for example, Urticaria Pruritus, Allergic Rhinitis, Anaphylactic shock and Asthma, and sometimes central nervous system activity (such as sedative or anti-convulsant activities) and anti-inflammatory activity when tested on warm-blooded animals. Most of the active compounds which have been prepared and tested have been found to possess action on the cardiovascular system.

In addition to having useful pharmaceutical properties as mentioned above the novel compounds of the invention are intermediates for the preparation of other compounds of formula I. The other compounds of the invention are also intermediates for the preparation of pharmacologically active compounds.

Examples of W are 1,2,3,4-tetrahydro-naphthyl (for example 1,2,3,4-tetrahydronaphth-6-yl), naphthyl and indenyl radicals which may be unsubstituted or substituted by one or more groups, which may be the same or different selected from halogen (for example fluorine, chlorine or bromine), lower alkyl (for example methyl, ethyl, propyl, or n, s and t-butyl), lower alkoxy (for example methoxy, ethoxy, propoxy or butoxy), nitro, amino (including alkyl or dialkyl substituted amino groups) in particular dialkylamino (for example dimethylamino or diethylamino), acylamino in particular alkanoylamino [for example acetylamino (acetamido)], hydroxyl, carboxyl, lower alkoxycarbonyl, alkylenedioxy (for example methylene dioxy), trihaloalkyl (for example trifluoromethyl), mercapto, methylthio, methylsulphonyl, phenyl and phenyl substituted by one or more of those substituents mentioned immediately above in connection with the group W.

Examples of A are methylene, ethylene, propylene, methylethylene, butylene, oxoethylene, oxo-butylene, hydroxyethylene and hydroxybutylene. Examples of R are phenyl, which may be substituted by the same substituents as those already described for the radical W, and also cyclohexyl. Examples of acid addition salts are those formed from inorganic and organic acids in particular pharmaceutically acceptable acid addition salts as the sulphate, hydrochloride, hydrobromide, hydroiodide, nitrate, phosphate, sulphonate (such as the methanesulphonate and p-toluene-sulphonate), acetate, maleate, fumerate, tartrate and formate.

The compounds of general formula (I) can be prepared in a number of ways by building up the molecule from suitable starting materials in known manner. Such processes applied to the preparation of the novel compounds of formula(I) are included in the scope of the invention.

One method of preparation of compounds of general formula (I) in which $R^2$ is the $-COR$ group comprises reacting a compound of the general formula:

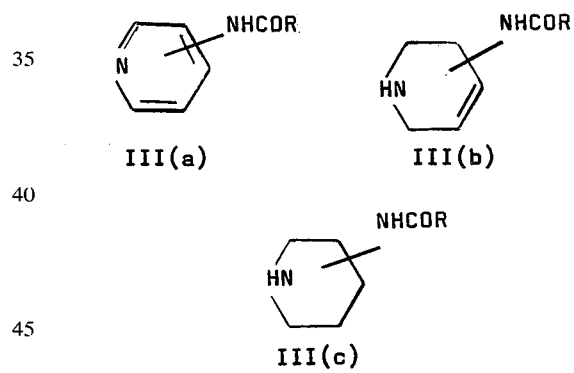

with an alkylating or acylating agent of the general formula:

(IV)

where R, W and A have the meanings already defined and Y is a halogen atom or an equivalent replaceable atom or radical, for example an organic sulphonyl radical such as tosyl radical to obtain a compound of formula Ia

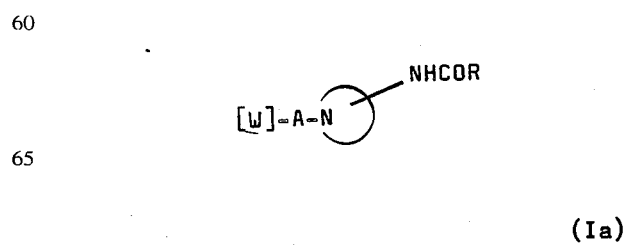

(Ia)

in which

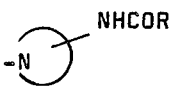

represents a ring system of general formula:

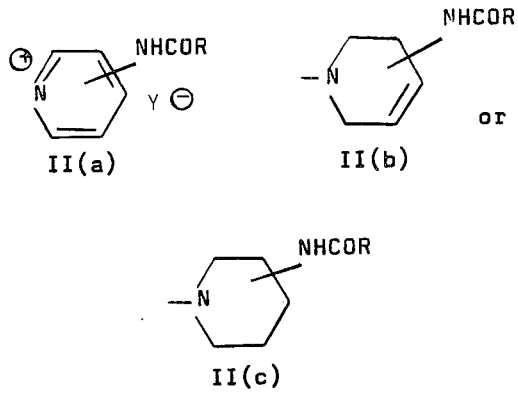

When a compound of formula III(a) or III(b) is used the product with ring system IIa or IIb is reduced as described below. As an alternative, the compounds of formula III(b) or III(c) may be reacted with (i) a compound of the formula:

[W]—A¹—H (V)

wherein the chain A¹ contains an epoxide residue for example

(VI)

to give a compound of formula (I) wherein the chain A is substituted by a hydroxyl radical, or (ii) a vinyl substituted compound of formula:

[W]—B (VII)

wherein B is a straight or branched chain alkenyl radical, preferably a vinyl radical to give a corresponding compound of formula I(a) wherein A is a straight or branched chain alkylene radical. Where the product contains a ring system of formula II(b) this may be reduced to one of formula II(c).

The compounds of general formulae (IV), (V), (VI) and (VII) are known compounds or can be made following the methods known for preparing compounds of these types. The starting materials of general formulae III(a), III(b) and III(c) can generally be made by acylating a corresponding amino compound of the general formula:

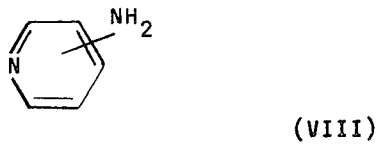

(VIII)

and if necessary reducing the ring system to the corresponding tetrahydropyridine or piperidine ring. The starting material of general formula III(c) is preferably prepared by either (i) forming the oxime of an N-benzyl-4-piperidone, reducing to give the 4-amino compound, acylating the amino group and then hydrogenolysing the benzyl residue, or (ii) treating the pyridine of formula:

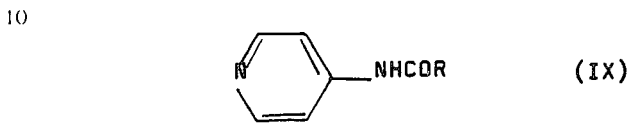

with a benzyl halide, for example benzyl chloride to give the quaternary salt, reducing with an alkali metal borohydride to give the corresponding N-benzyl-tetrahydropyridine which is further subjected to concomitant debenzylation and reduction of the 3,4-double bond by catalytic hydrogenation, or (iii) catalytic hydrogenation of compound (IX) in the presence of acetic anhydride to give

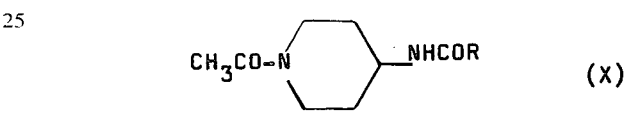

and then selectively hydrolysing the acetyl group.

A second general method of preparation of compounds of formula (I) in which $R^2$ is the —COR group, comprises reacting a compound of formula (I) in which $R^2$ is a hydrogen atom, with a reactive derivative of an acid of general formula R.COOH (where R is aryl, or cycloalkyl). As a reactive derivative of the acid of formula R.COOH used in the process described above, we have found it preferable usually to use a halide (for example the chloride or bromide) or an anhydride. Other examples of reactive derivatives of the acid R.COOH which may be used are the acid azide, mixed anhydrides and active esters. Furthermore, the compounds of formula (I) in which $R^2$ is the —COR group may also be prepared by treating a compound of formula (I) in which $R^2$ is a hydrogen atom with the acid R.COOH in the presence of a known condensing agent (for example, a carbodiimide), or by first activating the amino function (for example, by forming the phosphazo derivative) and then reacting with the acid R.COOH. In connection with the introduction of the —COR group into a compound of formula (I) in which $R^2$ is a hydrogen atom, reference may be made to "Chemistry of the Amino Acids" by Greenstein and Winitz (John Wiley & Sons, Inc., Publishers, 1961) at pages 782–883 and 943–1108.

When the compounds of general formula (I) are desired in which $R^2$ is the —COR group and A is a lower alkylene or a monoketo lower alkylene radical the preparation may comprise a Mannich reaction using formaldehyde, a compound of formula III(b) or III(c) as secondary amine and either a compound WH, where W has the meanings already defined and thus WH can be considered as a compound formed by addition of a hydrogen atom to said radical W; said compound WH also containing a suitable reactive site of the type known in the literature to participate in the Mannich reaction, or a derivative of W (as just defined) in which the chain A has already been partially formed, and which partially formed chain contains a site of the type known in the literature to participate in the Mannich reaction. Examples of the latter type of derivative are [W]—CH₃ and [W]—CO.CH₃ which derivatives are known compounds or can be made following the methods known for preparing compounds of these types. The formaldehyde used in the above reaction may be in the form of a solution in an inert solvent or as paraformaldehyde. A tetrahydropyridine product containing ring system II(b) is subsequently reduced to the piperidine compound.

When it is desired to prepare a compound of general formula (I) wherein $R^2$ is a hydrogen atom, a corresponding compound of formula:

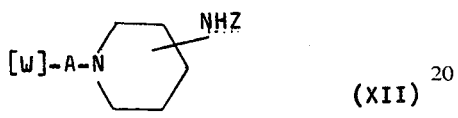

(XII)

(wherein W, has the meaning defined in connection with formula (I), and Z is a protecting group known in the art for the protection of the amino function and A has the meanings defined immediately above), is subjected to hydrolysis, hydrogenolysis or some other reaction known in the art for the removal of the protecting group Z. As examples of Z, mention is made of those wherein Z is the group —COR and R is lower alkyl, lower alkoxy and aryloxy (particularly methyl, ethoxy and phenoxy respectively ) or aryl. Other examples of Z are benzyl, p-toluene-sulphonyl, phthalyl, trityl, trifluoroacetyl, formyl and benzylsulphonyl. Reference may be made to the review of protecting groups in Advances in Organic Chemistry, 3, 191–294 (Interscience Publishers 1963), and also to Chemistry of the Amino Acids by Greenstin and Winitz, Vol.2, pages 885–924 (John Wiley & Sons, Inc., 1961). The compounds of general formula (XII) can be prepared following the information already given but using the appropriate acylating agent or other reagent to introduce the group Z.

A still further aspect of the invention is the provision of a further process for the preparation of compounds of general formula (I) where W has the meanings defined in connection with formula (I), $R^2$ is the group —COR, R has the meanings defined in connection with formula (I) and A is a lower alkylene radical and wherein the process consists of reacting a compound of the general formula

[W]—A—OH (XVI)

(in which W, and A have the meanings defined immediately above) with a compound of formula III(b) or III(c) in which $R^2$ has the meaning defined immediately above and where a compound of formula III(b) is used reducing the tetrahydropyridine ring II(b) to a piperidine ring as described below.

The reaction is preferably carried out in the presence of a catalyst, for example Raney Nickel. An organic solvent, which is inert under the reaction conditions, is usually used for example xylene, toluene or benzene. Preferably the reaction is carried out by heating the reactants under reflux in a water-immiscible organic solvent, for example xylene, and removing the water formed during the reaction by azeotropic distillation. If necessary, reactive substituent groups can be blocked during a reaction and released later.

In order to prepare a compound of formula (I) in which, W has the meanings defined in connection with formula (I), $R^2$ is the —COR group wherein R has the meanings defined in connection with formula (I) and A is a mono-keto lower-alkylene radical of formula —CO. (CH₂)ₘ— in which m is 1 to 5, a compound of formula:

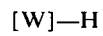

(XVII)

can be acylated (Friedel-Crafts) with an acid halide of formula:

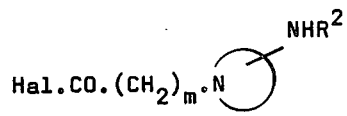

(XVIII)

For details of the reaction, reference may be made to "The Friedel-Crafts and related Reactions," by G. A. Olah, Vol. 2 (Interscience Publishers, 1964).

The reactions outlined above usually are carried out in a solvent which is inert under the reaction conditions. The most suitable solvent system is chosen and varies depending on the particular reactants being employed. If necessary heating the reactants in solution under reflux can be carried out, and if necessary heating under high pressures may also be used.

Once a compound of general formula (I) has been prepared, then if necessary one or more substituents in the molecule may be converted to another substituent each within its own meanings specified in connection with formula (I). If a compound of formula I(a) containing ring system II(a) is produced from a compound of formula III(a), the pyridinium ring system may be selectively reduced to the piperidine ring system giving a compound of formula I. For example, reduction with an alkali metal borohydride initially gives the tetrahydropyridine ring system of formula II(b) but by using stronger conditions e.g. refluxing isopropanol the compound of formula I can be obtained. On the other hand, catalytic hydrogenation, for example, in the presence of Raney Nickel or a platinum catalyst gives rise to the piperidine ring system. Similarly if a compound of formula I(a) is prepared in which

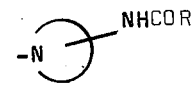

represents the tetrahydropyridine ring system of formula II(b), this may also be reduced to the piperidine ring system of formula II(c).

If a compound of formula (I) is prepared in which the chain A contains one or more carbonyl functions, then this chain may be selectively reduced. For example, when A is the oxalyl residue —CO.CO—, this may be reduced under mild conditions such as by a hydride transfer agent (particularly lithium aluminium hydride) to give the

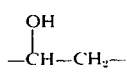

residue. When A is the —CO—CH$_2$— residue this may be reduced with an alkali metal borohydride to give the

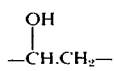

residue. When the oxalyl residue is reduced under more drastic conditions, the ethylene chain —CH$_2$—CH$_2$— results.

If a compound of formula (I) is produced in which R$^2$ is the —COR group, if necessary this may be hydrolysed to the compound of formula (I) in which R$^2$ is a hydrogen atom and which may then be reacted to give a compound of formula (I) in which R$^2$ is a different —COR group.

When a compound of formula (I) is produced wherein the radical W has one or more methoxy substituents, demethylation to the corresponding hydroxyl compound may be brought about in known manner. Furthermore, if the radical W has a nitro substituent this may be reduced in known manner to the corresponding amino compound which in turn may be further acylated or alkylated.

Compounds of formula I in which A contains a hydroxy group, i.e., hydroxy-lower-alkylene or —O—CH$_2$CH(OH)CH$_2$, or wherein A is a branched chain alkylene radical possess an asymmetric carbon atom and are therefore capable of existing in optically active stereo isomeric forms. The optical isomers may be separated by standard resolution procedures. For instance compounds such as those which contain the ring system of formula II($b$) or II($c$) contain a basic nitrogen atom and may generally be resolved by treatment with a suitable optically active acid. Optically active acids are described in the literature and suitable ones for the resolution of any particular compound are chosen by experiment.

If necessary, in any of the reactions hereinbefore described, reactive substituent groups may be blocked during a reaction and released at a later stage. As already indicated the novel tetrahydropyridine and piperidine compounds provided by the invention contain a basic nitrogen atom and thus can form acid addition salts with acids (particularly pharmaceutically acceptable acids) or quaternary ammonium salts, for example with alkyl halides or aralkyl halides (particularly methyl iodide or benzyl chloride or bromide). The acid addition salts may either be formed in situ during the hereinbefore described processes and isolated therefrom or a free base may be treated with the appropriate acid in the presence of a suitable solvent and then the salt isolated. The quaternary salts may be prepared by treating the free base with the appropriate halide in the presence or absence of a solvent.

The active compounds of the invention may be formulated as pharmaceutical compositions of the inventionn which contain as active ingredients a compound of formula (I) as hereinbefore defined which may be micronised. In addition to the active ingredient, said compositions also contain a non-toxic carrier. Any suitable carrier known in the art can be used to prepare the pharmaceutical compositions. In such a composition, the carrier may be a solid, liquid or mixture of a solid and a liquid. Solid form compositions include powders, tablets and capsules. A solid carrier can be one or more substances which may also act as flavouring agents, lubricants, solubilisers, suspending agents, binders, or tablet-disintegrating agents; it can also be an encapsulating material. In powders the carrier is a finely divided solid which is in admixture with the finely divided active ingredient. In tablets the active ingredient is mixed with a carrier having the necessary binding properties in suitable proportions and compacted in the shape and size desired. The powders and tablets preferably contain from 5 to 99, preferably 10–80% of the active ingredient. Suitable solid carriers are magnesium carbonate, magnesium stearate, talc, sugar, lactose, pectin, dextrin, starch, gelatin, tragacanth, methyl cellulose, sodium carboxymethyl cellulose, a low melting wax, and cocoa butter. The term "composition" is intended to include the formulation of an active ingredient with encapsulating material as carrier to give a capsule in which the active ingredient (with or without other carriers) is surrounded by carrier, which is thus in association with it. Similarly cachets are included.

Sterile liquid form compositions include sterile solutions, suspensions, emulsions, syrups and elixirs. The active ingredient can be dissolved or suspended in a pharmaceutically acceptable sterile liquid carrier, such as sterile water, sterile organic solvent or a mixture of both. Preferably a liquid carrier is one suitable for parenteral injection. Where the active ingredient is sufficiently soluble it can be dissolved in normal saline as a carrier; if it is too insoluble for this it can often be dissolved in a suitable organic solvent, for instance aqueous propylene glycol or polyethylene glycol solutions. Aqueous propylene glycol containing from 10 to 75% of the glycol by weight is generally suitable. In other instances compositions can be made by dispersing the finely divided active ingredient in aqueous starch or sodium carboxymethyl cellulose solution, or in a suitable oil, for instance arachis oil. Liquid pharmaceutical compositions which are sterile solutions or suspensions can be utilised by intramuscular, intraperitoneal or subcutaneous injection. In many instances a compound is orally active and can be administered orally either in liquid or solid composition form.

Preferably the pharmaceutical composition is in unit dosage form. In such form, the composition is subdivided in unit doses containing appropriate quantities of the active ingredient; the unit dosage form can be a packaged composition, the package containing specific quantities of compositions, for example packeted powders or vials or ampoules. The unit dosage form can be a capsule, cachet or tablet itself, or it can be the appropriate number of any of these in package form. The quantity of active ingredient in a unit dose of composition may be varied or adjusted from 5 mg. or less to 500 or more, according to the particular need and the activity of the active ingredient. The invention also includes the compounds in the absence of carrier where the compounds are in unit dosage form.

The following non-limiting Examples illustrate the invention:

EXAMPLE 1

1-[2-(1-Naphthyl)ethyl]-4-benzamidopiperidine 1-(2-Bromoethyl)naphthalene (3.0 g.) was added to a solution of 4-benzamidopiperidine (3.0 g.), diisopropylamine (4 ml.) and a trace of sodium iodide in dimethylformamide (10 ml.). The mixture was heated at 70°C overnight, then poured into water and extracted with methylene chloride. The washed and dried extracts were evaporated and the residue was recrystallised from benzene to give the title compound (3.0 g.) m.p. 160°–162°C. (Found: C, 80.5; H, 7.4; N, 7.5 $C_{24}H_{26}N_2O$ requires C, 80.4; H, 7.3; N, 7.8%).

The product exhibits depressant activity.

EXAMPLE 2

1-[2-(2-Naphthyl)ethyl]-4-benzamidopiperidine

Prepared in a similar manner to the compound of Example 1 but using 2-(2-bromoethyl)-naphthalene in place of the 1-isomer. The product (m.p. 190°–193°C) was crystallised from isopropanol. (Found C, 80.5; H, 7.5; N, 7.7. $C_{24}H_{26}N_2O$ requires C, 80.4; H, 7.3; N, 7.8%).

The product exhibits hypotensive activity. It also shows α-adrenoceptor antogonism, antihistamine and antiarrythmic activities.

EXAMPLE 3

1-[2-(3-Indenyl)ethyl-4-benzamidopiperidine 3-(2-Bromoethyl)indene (1.12 g.), 4-benzamidopiperidine (1.02 g.) and potassium carbonate (1.38 g.) were heated under reflux in isopropanol (25 ml.) for 24 hours. The mixture was filtered and the filtrate was evaporated. Trituration of the residue with ether gave a solid which was recrystallised twice from aqueous ethanol to provide the title compound, m.p. 148°–149°C. (Found: C, 79.7; H, 7.6; N, 8.0. $C_{23}H_{26}N_2O$ requires C, 79.7; H, 7.6; N, 8.1%).

The product exhibits hypotensive activity and antihistamine activity.

EXAMPLE 4

1-[3-(3-Indenyl)propyl]-4-benzamidopiperidine

Prepared in a similar manner to the compound of Example 3 but using 3-(3-bromopropyl)indene in place of 3-(2-bromoethyl)indene. The title compound crystallised from isopropanol, m.p. 157°–159°C. (Found C, 79.8; H, 8.1. N, 7.7. $C_{24}H_{28}N_2O$ requires C, 80.0; H, 7.8; N, 7.8%).

The product exhibits hypotensive and antihistamine activities.

EXAMPLE 5

1-[3-(1-Naphthoxy)-2-hydroxyprop-1-yl]-4-benzamidopiperidine 3-(α-Naphthoxy)-1-chloropropan-2-ol (1.18 g.) was refluxed for 16 hours in isopropyl alcohol (100 ml.) with 4-benzamidopiperidine (1.032 g.) and anhydrous potassium carbonate (1.037g.). The mixture was filtered hot, cooled and evaporated to dryness. The gum so obtained gave the title compound as a solid on triturating in ether, m.p. 139°–141°C. (Found C, 74.1; H, 7.1; N, 6.9. $C_{25}H_{26}N_2O_3$ requires C, 74.2; H, 7.0; N, 6.9%).

The product exhibits hypotensive activity and also some depressant activity.

EXAMPLE 6

1-[3-(1-Naphthyloxy)-propyl]-4-benzamidopiperidine

The title compound as its hydrochloride, m.p. 228°C (decomp.), was prepared by reacting together 3-naphthyloxypropyl bromide (2.07 g.), 4-benzamidopiperidine (1.8 g.) and anhydrous potassium carbonate (1.24 g.) at 100°C for 1 hour. The solid residue was slurried with hot water (100 ml.) for 3 hours filtered, washed with ether and dried to give a solid which was dissolved in ethanolic hydrogen chloride, treated with ether and then cooled to 0°C to give the title compound as its hydrochloride. (Found: C, 70.4; H, 7.0; N, 6.6. $C_{25}H_{28}N_2O_2$ HCl requires C, 70.65; H, 6.9; N, 6.6%).

The product exhibited marked hypotensive activity.

EXAMPLE 7

1-[2-(1,2,3,4-Tetrahydro-6-naphthyl)-2-oxoethyl]-4-benzamidopiperidine

A solution of 6-chloroacetyl-1,2,3,4,-tetrahydronaphthalene (20.87 g.), 4-benzamidopiperidine (20.4 g.) and triethylamine (11.1 g.) in dimethylformamide (200 ml.) was stirred for 3 days at room temperature. The crystals which had formed during this time were then filtered off, washed and dried. A portion of this crystalline solid (4.0 g.) was dissolved in ethanol (50 ml.) and acidified with ethanolic hydrogen chloride to give 4.0 g. of the hydrochloride of the title compound, m.p. 270°C (decomp.). (Found: C, 69.5; H, 7.2; N, 6.8; $C_{24}H_{28}N_2O_2$HCl requires C, 69.7; H, 7.1; N, 6.8%).

The product exhibited hypotensive activity.

EXAMPLE 8

1-[2-(1,2,3,4-Tetrahydro-6-naphthyl)-2-hydroxyethyl]-4-benzamidopiperidine

The title compound as its hydrochloride, m.p. 253°C (decomp.), was prepared by reduction of the free base of the compound obtained in Example 7 using sodium borohydride in methanol with sodium hydroxide. The resulting mixture was stirred for a further 2 hours and then heated under reflux for 4 hours. The resulting mixture was filtered, the filtrate evaporated almost to dryness and then treated with hot water (100 ml.). The solid was filtered off, washed with water, dried, dissolved in a small amount of ethanolic hydrogen chloride and treated with ether until crystallisation commenced. Filtration and drying gave the hydrochloride. (Found C, 69.7; H, 7.5; N, 6.6. $C_{24}H_{30}N_2O_2$HCl requires C, 69.5; H, 7.5; N, 6.75%). The product exhibited hypotensive activity.

EXAMPLE 9

1-[4-(1,2,3,4-Tetrahydro-6-naphthyl)-4-oxobutyl]-4-benzamidopiperidine

6-Chlorobutryl-1,2,3,4-tetrahydronaphthalene (6.4 g.), 4-benzamidopiperidine (2.0 g.) and anhydrous potassium carbonate (1.38 g.) were reacted and worked up as described in Example 6 to give the hydrochloride of the title compound, m.p. 221°C (Found: C, 68.4; H, 7.7; N, 6.0. $C_{26}H_{32}N_2O_2$.HCl. $H_2O$ requires C, 68.0; H, 7.7; N, 6.1%.

The product exhibited hypotensive activity.

EXAMPLE 10

4-Benzamido-1-[2-(2-naththyl)ethyl]piperidine 2-(2-Naphthyl)ethanol(3.44 g., 0.02 mole), 4-benzamidopiperidine (4.08 g., 0.02 mole) and Raney Nickel (W7 ca. 5 g.) were suspended in xylene (200 ml.) and the stirred mixture boiled under reflux for 16 hours. Liberated water was removed by means of a Dean and Stark apparatus. The mixture was filtered hot and evaporated to ca. 100 ml. The resulting yellow solution was stored until crystallisation was complete. The title compound was obtained as off-white needles (3.30 g.), m.p. 189°–191°C.

The product exhibited hypotensive activity.

EXAMPLE 11

The following compounds were prepared in a similar manner to that described in the hereinbefore disclosed Examples and processes: 1-[2-(2-Naphthyloxy)ethyl]-4-benzamidopiperidine and 1-[3-(2-Naphthyloxy)propyl]-4-benzamidopiperidine.

EXAMPLE 12

A.

1,1,3,4,4,6-Hexamethyl-7-bromoacetyl-1,2,3,4-Tetrahydronaphthalene

A solution of 1,1,3,4,4,6-Hexamethyl-7-acetyl-1,2,3,4-tetrahydronaphthalene (33 g.) in 40 ml. glacial acetic acid was treated slowly with 20 g. bromine. Warming was necessary to initiate the reaction, evidenced by disappearance of the red colouration. When all the bromine had been added, the mixture was cooled and poured onto ice to give a pale green gum. The whole was extracted with ether, the ethereal extracts washed with dilute $Na_2CO_3$, water and finally dried over $MgSO_4$. Evaporation of the ether gave a pale green solid which was recrystallised from EtOH to give the title compound 27.6 g. (64%), m.p. 68°C. Analysis: Calculated for $C_{18}H_{25}OBr$, C, 64.09% H, 7.47%. Found: C, 64.40%; H, 7.65%.

B.

7-(4-Benzamidopiperidinoacetyl)-1,1,3,4,4,6-hexamethyl-1,2,3,4-tetrahydronaphthalene A mixture of 1,1,3,4,4,6-hexamethyl-7-bromoacetyl-1,2,3,4-tetrahydronaphthalene (7 g.), 4-benzamidopiperidine (4.27 g.) and triethylamine (3.5 g.) was refluxed in 100 ml. EtOH for 2 hours. The resulting yellow solution was cooled, whereupon the product crystallised. This was recrystallised twice from EtOH/water to give the title compound (2.3 g.) as a pale yellow solid, m.p. 153° (dec.) Analysis: Calculated for $C_{30}H_{40}N_2O_2$: C, 78.22%, H, 8.75; N, 6.08%. Found: C, 78.29% H, 8.92%; N, 6.14%

The product exhibits hypotensive activity in a standard test procedure.

EXAMPLE 13

7-[2-(4-Benzamidopiperid-1-yl)-1-hydroxyethyl]1,1,3,4,4,6-hexamethyl-1,2,3,4-tetrahydronaphthalene A solution of 7-(4-benzamidopiperidinoacetyl)-1,1,3,4,4,6-hexamethyl-1,2,3,4-tetrahydronaphthalene (10 g.) in methanol was cooled to 0°–10°C and treated with 1.1 g. sodium borohydride over ½–1 hour. The resulting solution was refluxed for 30 minutes, the solvent removed in vacuo, and the white solid residue treated with dilute HCl to give a flocculent white suspension, which was filtered off and recrystallised from EtOH/$H_2O$ to give the title compound as the hydrochloride monohydrate 8.62 g. (78%), m.p. 253°(dec.). Analysis: Calculated for: $C_{30}H_{42}N_2O_2$.HCl $H_2O$: C, 69.64%; H, 8.77%; N, 5.41%. Found: C, 69.46%; H, 8.95%, N, 5.12%.

The product exhibited hypotensive activity.

EXAMPLE 14

4-Amino-1-[2-(2-naphthyl)ethyl]-piperidine

4-Benzamido-1-[2-(2-naphthyl)ethyl]piperidine (1.0 g.) was suspended in 6N HCl (40 ml.) and boiled for 96 hr. The resulting solution was cooled, filtered (to remove benzoic acid) and the filtrate basified with potassium carbonate. The oil which separated was extracted into chloroform which on evaporation gave the title compound as the free base. This was dissolved in ethanol, ethanol/HCl added until acid to give the title compound (0.558 g.) as the dihydrochloride, pale yellow needles, m.p. >300° (decomp). Analysis Found: C, 62.33; H, 7.26; N, 8.48. $C_{17}H_{22}N_2$. 2HCl requires C, 62.38; H, 7.39; N, 8.56%.

The product is useful as an intermediate for the preparation of the corresponding 4-acylamido compounds.

EXAMPLE 15

1-[4-(1',2',3',4'-Tetrahydro-6'-naphthyl)-4-hydroxybutyl]-4-benzamidopiperidine

1-[4-(1',2',3',4'-tetrahydro-6'-naphthyl)-4-oxobutyl]-4-benzamidopiperidine (4.046 g., 0.01 mole) was dissolved in methanol (500 ml.) at 15°C, and while stirring a solution of sodium borohydride (10.0 g.) in 0.2 N sodium hydroxide solution (200 ml.) was added over 1 hour.

The reaction mixture was stirred at room temperature for 20 hours, refluxed for 2 hours and filtered while hot. The methanol was distilled from the filtrate and the title compound crystallised out. This was converted to the hydrochloride by passing hydrogen chloride gas into a solution in methanol until acid and adding ethyl acetate and ether to precipitate the salt. The yield in two crops was 3.715 g., (84%) m.p. 238.9°. $C_{26}H_{34}N_2O_2$.HCl. ¼.H 2O requires C, 69.79; H, 8.00; N, 6.26. C, 69,85; H, 8.12; N, 6.38%.

The product exhibited hypotensive activity in a standard test procedure.

EXAMPLE 16

1-[4-(2-Naphthyl)-4-oxobutyl]-4-benzamidopiperidine

4-Benzamidopiperidine (8.172 g., 0.04 mole) was alkylated with 4-chloro-1-(2'-naphthyl)butan-1-one (11.636 g.) by heating the reaction mixture with anhydrous potassium carbonate at 100° for 2 hours. To the yellow solid was added water (300 ml.) and the crude title product was filtered off, washed with water, and then ether. The base obtained (7.561 g.) was converted to the hydrochloride by treating a solution in hot absolute ethanol with ethanolic hydrogen chloride and then cooling the mixture to yield 6.895 g., (40%), m.p. 250.6°. $C_{26}H_{28}N_2O_2$.HCl. ¾.$H_2O$ requires C, 69.33; H, 6.82; N, 6.22; Found: C, 69.60; H, 6.91; N, 6.10%.

The product exhibited hypotensive activity in a standard test procedure.

EXAMPLE 17

1-[4-(1',2',3',4'-Tetrahydro-6-naphthyl)butyl]-4-benzamidopiperidine

To a warm solution of 1-[4-(1',2',3',4'-tetrahydro-6'-naphthyl)-4-oxobutyl]-4-benzamidopiperidine (12.447 g.) in ethylene glycol (150 ml.) was added hydrazine hydrate (55 ml. of an 80% aqueous solution). The mixture was refluxed (liquid temperature 135°–140°) for 50 minutes. Potassium hydroxide pellets (6.0 g.) were added and the excess hydrazine and water were distilled off over 30 minutes during which time the temperature rose to 185°. Refluxing at this temperature was continued for a further 30 minutes. The hot mixture was poured into cold distilled water (500 ml.) and then allowed to stand at 0° overnight. An impure white solid was filtered off. This was converted to the hydrochloride as in Example 16 with the addition of ether to induce crystallisation. After filtering off an impure first crop the concentrated mother liquor gave the title product as the hydrochloride, quarter hydrate, 1.965 g., (15%) m.p. 240.7°. $C_{26}H_{34}N_2O \cdot HCl \cdot \frac{1}{4} H_2O$ requires C, 72.43; H, 8.29; N, 6.49. Found C, 72.05; H, 8.10; N, 6.35%.

The product exhibited hypotensive activity in a standard test procedure.

EXAMPLE 18

1-[4-(2'-Naphthyl)-4-hydroxybutyl]-4-benzamidopiperidine

Using the method of Example 15, 1-[4-(2'-naphthyl)-4-oxobutyl]-4-benzamidopiperidine (15.647 g.) was reduced to the title compound, obtained as the hydrochloride, hemihydrate (9.457 g., 54.0%) m.p. 241.3°. $C_{26}H_{30}N_2O_2 \cdot HCl \cdot \frac{1}{2} H_2O$ requires C, 69.71; H, 7.20; N, 6.25. Found: C, 69.31; H, 7.00; N, 6.16%

The product exhibited hypotensive activity in a standard test procedure.

EXAMPLE 19

4-Cyclohexane-carboxamido-1-[2-naphth-2-yl)ethyl]piperidine

A solution of 4-amino-1-[2-(2'-naphthyl)ethyl]-piperidine (2.544 g., 0.01 mole) in chloroform (50 ml.) was stirred with an aqueous solution of potassium carbonate (2.764 g., 0.02 mole in 20 ml.). Over 5 minutes a solution of cyclohexane carbonyl chloride (1.466 g., 0.01 mole) in chloroform (10 ml.) was added and the reaction mixture was stirred overnight. The layers were separated, the aqueous one was washed with fresh chloroform, and the washings combined with the extract were dried (MgSO$_4$) and evaporated to give the title compound. This was converted to the hydrochloride as in Example 16 adding ether to induce crystallisation to yield 2.804 g., (70%) m.p. 232°–233°. $C_{24}H_{32}N_2O \cdot HCl$ requires C, 71.91; H, 8.29; N, 6.99. Found: C, 71.77; H, 8.26; N, 6.94%.

The product exhibited hypotensive activity in a standard procedure.

Tests for action on the cardiovascular system were conducted according to one of the following procedures:

Hypotensive and/or Anti-Hypertensive activity

Method 1 (Rat)

Rats were anaesthetised with pentobarbitone sodium (60 mg/kg) and the jugular vein, trachea and carotid artery were cannulated. The test compound was given intravenously at 15 min. intervals (dose range 0.8–25.6 mg/kg cumulative) and blood pressure and heart rate were recorded via the carotid artery at 30 second and 15 minutes after administration. The production of a fall of 30 mm. mercury in diastolic pressure from control values was considered to be significant hypotensive activity. A decrease in heart rate of more than 30% from control values was considered to be significant bradycardia.

Method 1 (Cat)

Cats were anaesthetised with pentobarbitone sodium (30 gm/kg) and the cephalic vein, femoral and carotid arteries and trachea were cannulated. The carotid cannula was introduced into the left ventricle and the femoral cannula into the aorta. Blood pressure and heart rate were recorded from the aortic cannula and left ventricular pressure from the carotid cannula. The test compounds were administered intravenously (0.1–25.6 mg/kg).

Method 2 (hypertensive rats)

Male or female rats are rendered hypertensive by applying a figure of 8 ligature around one kidney and contralateral nephrectomy. Blood pressure stabilises at a hypertensive level after 6 weeks. Systolic pressure is measured indirectly using a Decker Caudal Plethysmograph. A control group of rats is run with each group treated with drug. Each group usually consists of six rats. Drugs are usually administered by the IP or oral routes. Pressures are read prior to drug administration and at two and 24 hours thereafter.

α-Adrenoceptor Antagonism Activity

Carried out on the guinea pig aortic strip [Furchgott and Bhadrakom (1953) J. Pharmac. Exp. Ther. 108, 129–143] by the method of Alps et al [Br. J. Pharmac. 1972 44, 52–62].

Antihistamine activity was determined by the method of Alps et al [Br. J. Pharmacol, 1972, 44, 52–62]

Activity in either method 1 (rats or cats) or method 2 was considered to indicate hypotensive activity.

We claim:

1. A heterocyclic compound of the formula:

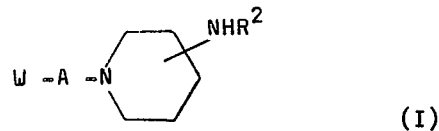

(I)

wherein W represents a carbocylic aryl radical selected from naphthyl, 1,2,3,4-tetrahydro-naphthyl and indenyl radicals, A represents a lower alkylene radical, a mono-keto lower alkylene radical, a hydroxy-lower-alkylene radical or a bivalent radical of the formula —O—CH$_2$CH(OH) CH$_2$— or —O—(lower alkylene)—, R$^2$ represents hydrogen or the group —COR, where R represents a phenyl radical or a cyclohexyl radical, the term "lower" means that the radical contains from 1 to 6 carbon atoms, or a pharmaceutically acceptable acid addition salt thereof.

2. A compound as claimed in claim 1 which is 1-[2-(2-naphthyl)ethyl]-4-benzamidopiperidine or a pharmaceutically acceptable acid addition salt thereof.

3. A compound as claimed in claim 1 which is 1-[3-(1-naphthyloxy)-propyl]-4-benzamidopiperidine or a pharmaceutically acceptable acid addition salt thereof.

4. A compound as claimed in claim 1, which is 1-[3-(1-naphthoxy)-2-hydroxy-prop-1-yl]-4-benzamidopiperidine or a pharmaceutically acceptable acid addition salt thereof.

5. A compound as claimed in claim 1 which is 1-[2-(1,2,3,4-tetrahydro-6-naphthyl)-2-hydroxyethyl]-4-benzamidopiperidine or a pharmaceutically acceptable acid addition salt thereof.

6. A compound as claimed in claim 1, which is 1-[4-(1,2,3,4-tetrahydro-6-naphthyl)-4-oxobutyl]-4-benzamido-piperidine or a pharmaceutically acceptable acid addition salt thereof.

7. A compound as claimed in claim 1, which is 7-[2-(4-benzamidopiperid-1-yl)-1-hydroxyethyl]-1,1,3,4,4,6-hexamethyl-1,2,3,4-tetrahydronaphthalene or a pharmaceutically acceptable acid addition salt thereof.

8. A compound as claimed in claim 1, which is 1-[4-(1',2',3',4'-tetrahydro-6'-naphthyl)-4-hydroxybutyl]-4-benzamidopiperidine or a pharmaceutically acceptable acid addition salt thereof.

9. A compound as claimed in claim 1 which is 1-[4-(2-naphthyl)-4-oxobutyl]-4-benzamidopiperidine or a pharmaceutically acceptable acid addition salt thereof.

10. A compound as claimed in claim 1, which is 1-[4-(1',2',3',4'-tetrahydro-6-naphthyl)butyl]-4-benzamidopiperidine or a pharmaceutically acceptable acid addition salt thereof.

11. A compound as claimed in claim 1, which is 1-[4-(2'-Naphthyl)-4-hydroxybutyl]-4-benzamidopiperidine or a pharmaceutically acceptable acid addition salt thereof.

12. A compound as claimed in claim 1, which is 1-[3-(3-indenyl)propyl]-4-benzamidopiperidine.

* * * * *